США008644444B2

(12) United States Patent
Dietrich et al.

(10) Patent No.: US 8,644,444 B2
(45) Date of Patent: Feb. 4, 2014

(54) NUCLEAR FUEL ASSEMBLY FOR BOILING WATER REACTOR

(75) Inventors: Matthias Dietrich, Freigericht (DE);
Michael Liebler, Heilsbronn (DE);
Hans-Joachim Lippert, Höchstadt (DE); Roland Rink, Erlangen (DE);
Jens Schäfer, Erlangen (DE); Thomas Schubert, Soest (DE)

(73) Assignee: Areva NP, Courbevoie (FR)

( * ) Notice: Subject to any disclaimer, the term of this patent is extended or adjusted under 35 U.S.C. 154(b) by 665 days.

(21) Appl. No.: 12/935,198

(22) PCT Filed: Mar. 30, 2009

(86) PCT No.: PCT/EP2009/053763
§ 371 (c)(1),
(2), (4) Date: Feb. 9, 2011

(87) PCT Pub. No.: WO2009/121852
PCT Pub. Date: Oct. 8, 2009

(65) Prior Publication Data
US 2011/0129051 A1    Jun. 2, 2011

(30) Foreign Application Priority Data
Mar. 31, 2008  (EP) .................................. 08300166

(51) Int. Cl.
*G21C 3/32*    (2006.01)
(52) U.S. Cl.
USPC ......................................................... 376/434
(58) Field of Classification Search
USPC .......... 376/434, 439, 444, 440, 435, 428, 361
See application file for complete search history.

(56) References Cited

U.S. PATENT DOCUMENTS

| 4,486,384 A | * | 12/1984 | Rau et al. ...................... 376/353 |
| 4,876,062 A | * | 10/1989 | Aoyama et al. ............... 376/444 |
| 4,957,698 A | * | 9/1990 | Ritter ............................ 376/444 |
| 4,968,479 A | | 11/1990 | Ogiya et al. |

(Continued)

FOREIGN PATENT DOCUMENTS

| EP | 0 526 777 | 2/1993 |
| JP | 63 235890 A | 9/1988 |
| JP | 02 249995 A | 10/1990 |
| JP | 2000 214287 | 8/2000 |

OTHER PUBLICATIONS

International Search Report for PCT/EP2009/053763.

*Primary Examiner* — Michael Carone
*Assistant Examiner* — Reginald Tillman, Jr.
(74) *Attorney, Agent, or Firm* — Davidson, Davidson & Kappel, LLC

(57) ABSTRACT

An assembly of the type having a water channel extending along a longitudinal axis and having an upper section of larger cross-section area than a lower section and at least one fuel rod receiving groove extending longitudinally on the outer surface of the lower section, fuel rods extending longitudinally and disposed around the water channel and fixing members for fixing at least one fuel rod to the water channel in the at least one groove below the upper section.

According to one aspect of the invention, the at least one groove extends along the upper section such that a fuel rod received in fixing members is longitudinally extractable or insertable from the upper end side of the fuel assembly.

15 Claims, 4 Drawing Sheets

(56) References Cited

U.S. PATENT DOCUMENTS

| | | | | |
|---|---|---|---|---|
| 5,068,082 A | * | 11/1991 | Ueda et al. | 376/428 |
| 5,174,949 A | * | 12/1992 | Johansson | 376/439 |
| 5,202,085 A | * | 4/1993 | Aoyama et al. | 376/435 |
| 5,299,244 A | * | 3/1994 | Yamauchi et al. | 376/438 |
| 5,420,902 A | * | 5/1995 | Dressel et al. | 376/442 |
| 5,572,560 A | * | 11/1996 | Brown | 376/435 |

* cited by examiner

NUCLEAR FUEL ASSEMBLY FOR BOILING WATER REACTOR

The present invention relates to a nuclear fuel assembly for boiling water reactors, of the type comprising a water channel extending along a longitudinal axis and having an upper section of larger cross-section area than a lower section and at least one fuel rod receiving groove extending longitudinally on the outer surface of the lower section, fuel rods extending longitudinally and disposed in an array around the water channel and fixing members for fixing at least one fuel rod to the water channel in the at least one groove below the upper section.

BACKGROUND

A conventional nuclear fuel assembly for boiling water reactor comprises a bundle of fuel rods and a water channel arranged in a fuel channel, the water channel being surrounded by the fuel rods. In operation, water flows through the water channel and through the fuel channel, from lower end to upper end of the fuel assembly.

Water serves as a moderator for the nuclear reaction and as a coolant. Water is progressively heated, so that water is in vapour-liquid phase nearby the upper end of the fuel assembly.

The water channel enables to increase the moderator (water) to fuel ratio and the coolant amount near the central region of the fuel assembly.

The moderator (water) to fuel ratio tends to decrease toward the upper end of the fuel assembly as the proportion of vapour increases in the water flow, namely in the water channel. The decrease of said ratio leads to a less efficient burning of the fuel in the upper region.

Providing fuel rods of shorter length enables to reduce the amount of nuclear fuel in the upper region of the fuel assembly and to improve burning of the nuclear fuel in said upper section.

Providing a water channel having an upper section of larger cross-section area enables to increase the amount of water in the upper region, to compensate the increase of vapour in the water flow, and to thus improve burning of the fuel rods.

U.S. Pat. No. 5,202,085 describes a nuclear fuel assembly having a water channel surrounded by fuel rods. The water channel has a lower section having a cruciform cross-section occupying a region equivalent to five fuel rod cells and an upper section of square cross section occupying a region equivalent to nine fuel rod cells. The fuel rods comprise shorter fuel rods disposed adjacent the water channel beneath the upper region.

However, such an arrangement makes it difficult to catch the shorter fuel rods located beneath the upper section, e.g. in view of replacing one of these fuel rods.

SUMMARY OF THE INVENTION

An object of the invention is to provide a water channel for a nuclear fuel assembly for a boiling nuclear reactor which enables to improve burning of the fuel while making handling of the fuel rods more convenient.

To this end, the invention provides a water channel of the above-mentioned type, wherein the at least one groove extends along the upper section such that a fuel rod received in fixing members is longitudinally extractable or insertable from the upper end side of the fuel assembly.

In other embodiment of the invention, the water channel comprises one or more of the following features, taken in isolation or in any technically feasible combination:

the or each groove is of constant width along the lower section and the upper section;

the or each groove has a depth larger in the lower section than in the upper section;

the or each groove is adapted to receive at least one fuel rod;

the or each groove is adapted to receive at least two fuel rods side-by-side;

the water channel has a main duct and at least two lateral ducts in fluid communication with the main duct along the whole length of the water channel, lateral ducts defining between them at least one fuel rod reception groove on the outer surface of the water channel;

each lateral duct has a cross section area which is constant along the length of the water channel, and the main duct has a larger cross section area in the upper section than in the lower section;

each lateral duct replaces at least one fuel rod in the array;

each lateral duct replaces one fuel rod in the array;

the main duct replaces at least one fuel rod in the array;

the main duct replaces a square unit of several fuel rods in the array;

the main duct replaces a four fuel rods square unit in the array;

the water channel has four lateral ducts defining between them four fuel rod reception grooves around the water channel;

the water channel has a cruciform cross section replacing fuel rods disposed in the diagonals of a fuel rods square unit of the array;

the water channel replaces fuel rods disposed in the diagonals of a sixteen fuel rods square unit of the array.

BRIEF DESCRIPTION OF THE DRAWINGS

The invention and its advantages will be better understood upon reading the following description, given solely by way of example and with reference to the appended drawings, in which.

DETAILED DESCRIPTION

Figure 1:
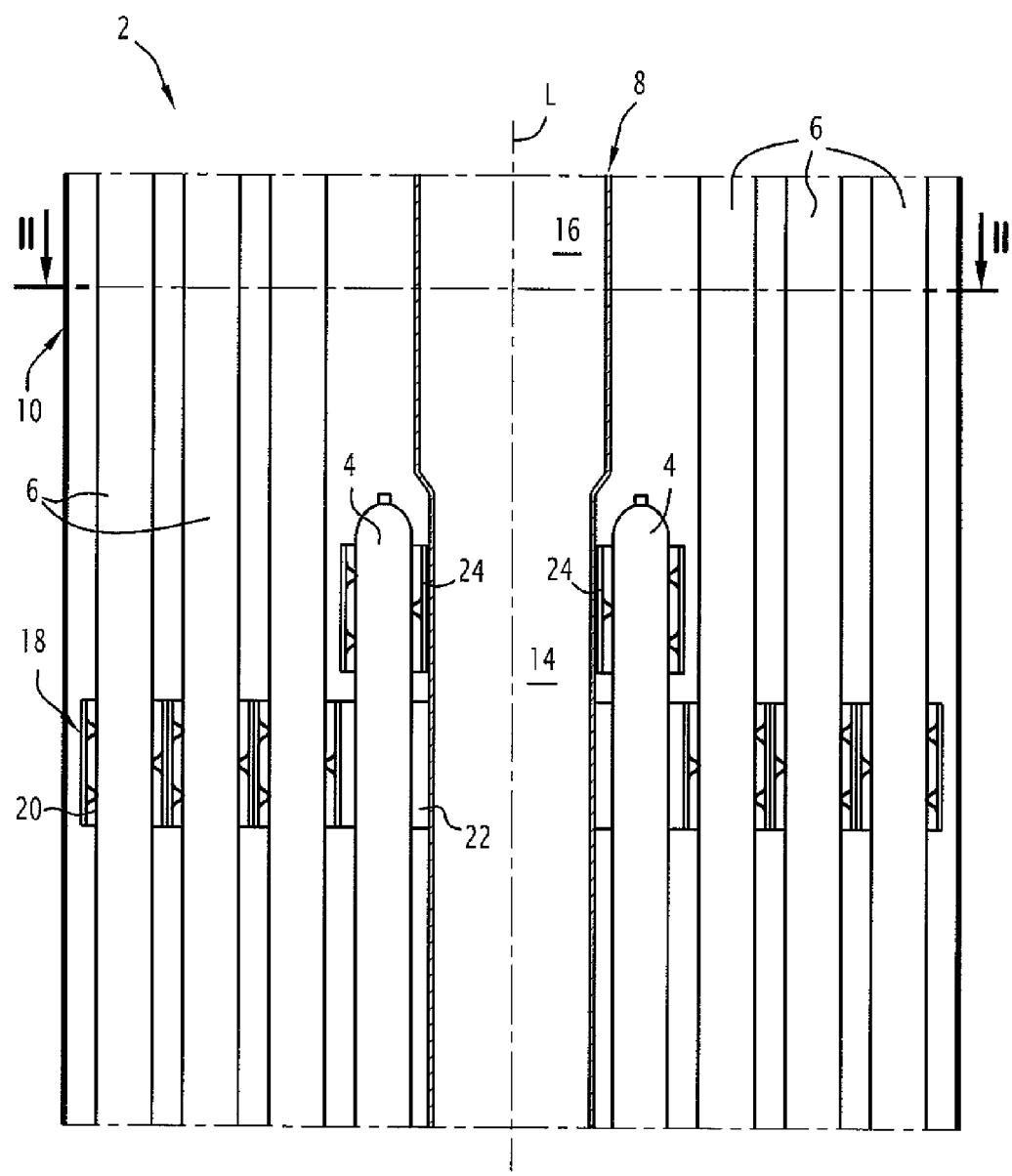
FIG. 1 is a schematic partial view of a nuclear fuel assembly for boiling water reactor, the fuel assembly comprising a water channel.

As illustrated on FIG. 1, the nuclear fuel assembly 2 is elongated along a longitudinal central axis L. Only an intermediate section of the fuel assembly 2 is represented on FIG. 1.

In use, the fuel assembly 2 is placed in the core of a nuclear reactor with the axis L extending substantially vertically. In the following, the terms "lower" and "upper" refer to the position of the fuel assembly 2 in the reactor.

The fuel assembly 2 comprises a bundle of nuclear fuel rods 4, 6 and a water channel 8 arranged in a fuel channel 10. The fuel rods 4, 6, the water channel 8 and the fuel channel 10 are elongated and extend longitudinally parallel to axis L.

Each fuel rod 4, 6 comprises a tubular cladding filled with stacked nuclear fuel pellets.

The water channel 8 is surrounded by the fuel rods 4, 6. The water channel is tubular and elongated along direction L. The water channel 8 comprises a tubular lower section 14 and a tubular upper section 16 of larger cross section area than the lower section 14.

The fuel rods 4, 6 are arranged in an array and the water channel 8 replaces some of the fuel rods in the array.

Fuel rods 4 are shorter than fuel rods 6. The shorter fuel rods 4 extend only along the lower section 14 without extending along the upper section 16. The longer fuel rods 6 extend along the lower section 14 and the upper section 16, i.e. substantially along the whole length of the water channel 8.

The fuel assembly 2 comprises fuel rod supporting spacers 18 distributed along the length of water channel 8, only one spacer 18 being illustrated on FIG. 1.

The spacer 18 is latticed and comprises a plurality of cells 20 for receiving the longer fuel rods 6 therethrough, and a central passage 22 for receiving the water channel 8 and the shorter fuel rods 4.

The spacer 18 is guided by the water channel 8 and its axial movement is restricted, e.g. by welded spacer stops.

The fuel assembly 2 comprises fixing members 24 for receiving the shorter fuel rods 4. The fixing members 24 are fixed along the lower section 14 of water channel 8 for fixing the shorter fuel rods 4 adjacent to the water channel 8.

Figure 2:
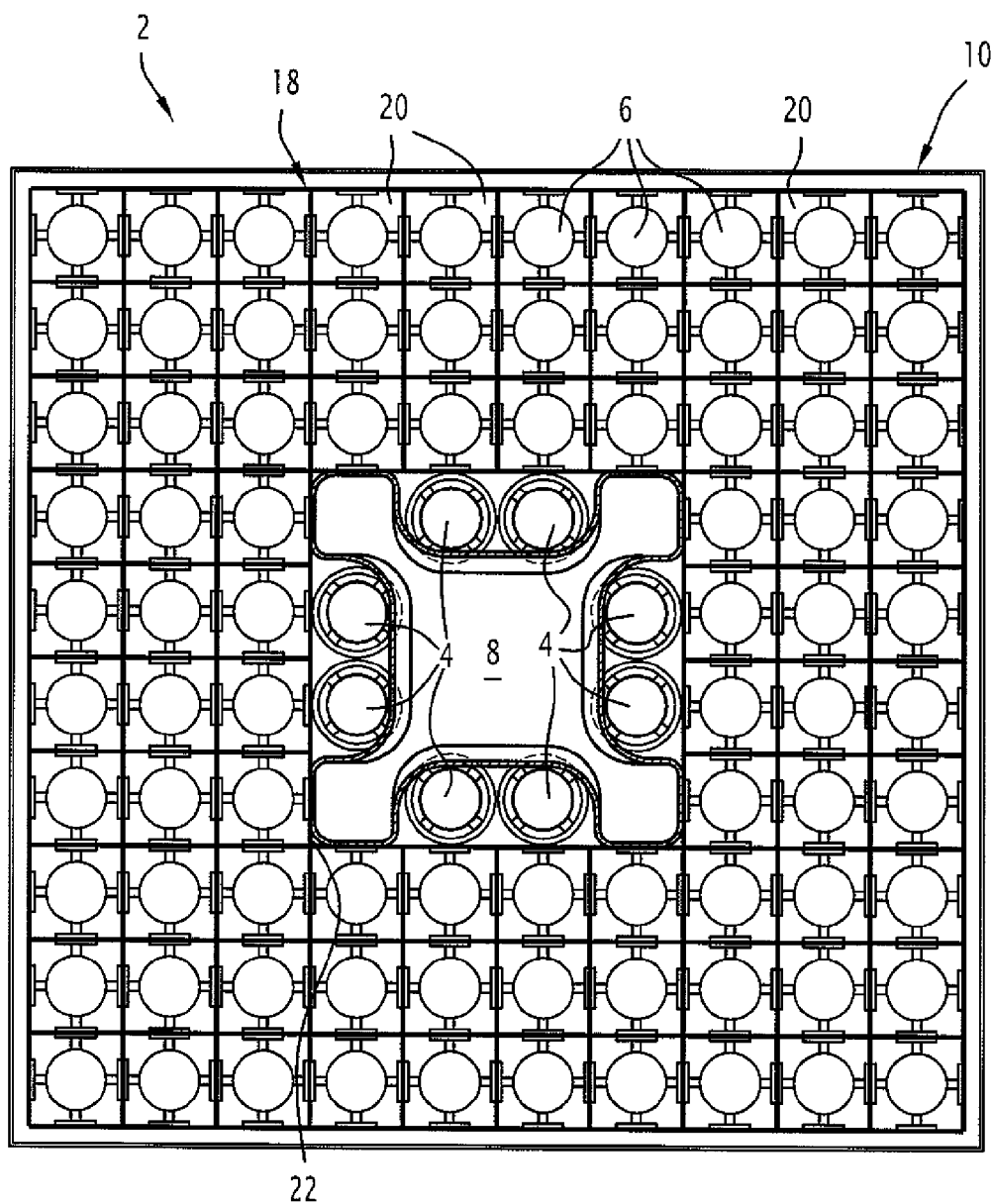
FIG. 2 is a sectional view of the fuel assembly along II-II on FIG. 1.

As illustrated on FIG. 2, each longer fuel rod 6 extends through a respective cell 20 and is supported transversally by the spacer 18 to maintain the transversal gap between the longer fuel rods 6.

To this end, each cell 20 has protrusions protruding from the lateral walls of the cell 20 to contact the outer surface of the longer fuel rod 6 inserted through the cell 20.

In the represented embodiment, the spacer 18 is arranged such that the cells 20 are disposed in a 10×10 lattice with the passage 22 replacing the sixteen cells square unit at the centre of the network.

As illustrated on FIG. 3, the lower section 14 and the upper section 16 of the water channel 8 have cross sections of the same shape, upper section 16 having however a larger cross section area that lower section 14, as it will be explained later.

The water channel 8 has a cruciform cross section and replaces eight fuel rods in the array, the branches of the cross corresponding to the two diagonals of a sixteen fuel rods square unit in the array.

The water channel 8 has a main duct 26 and four lateral ducts 28 in fluid communication with the main duct 26 through transverse openings 30 extending along the whole length of the water channel 8.

The main duct 26 has a substantially square section and replaces a four fuel rods square unit in the array, and each lateral duct 28 has a substantially square section and replaces one fuel rod in the array.

Each lateral duct 28 is disposed at one of the four corners of the main duct 26 and aligned with the diagonals of the main duct 26.

The water channel 8 has four grooves 32 provided on the outer surface 34 thereof and distributed around the longitudinal axis of the water channel 8. Each groove 32 is adapted to receive two shorter fuel rods 4 side-by-side.

Each groove 32 is defined between two lateral ducts 28. Each groove 32 has a U-shaped cross section defined by a bottom wall 36 and two lateral walls 38.

The bottom wall 36 externally defines the groove 32 and internally defines the main duct 26. Each lateral wall 38 externally defines the groove 32 and internally defines a lateral duct 28. The main duct 26 is thus defined by the bottom walls 36 of the grooves 32.

The walls of the water channel 8 have a constant thickness along the length of the water channel 8. The varying cross section area of the water channel 8 is obtained via deformations of the walls of the water channel 8.

In view of obtaining a larger cross section area in the upper section 16, the main duct 26 has a larger cross section area in the upper section 16 than in the lower section 14.

To this end, the main duct 26 has a diverging section 40 at the junction between the lower section 14 and the upper section 16, in which the bottom walls 36 are inclined relative to the longitudinal axis of the water channel 8 and diverge from lower section 14 towards upper section 16.

Each lateral duct 28 has a constant cross section area along the length of the water channel 8.

Each groove 32 has a constant width W along the length of the water channel 8 (i.e. along the lower section 14 and the upper section 16) and a depth D larger along the lower section 14 than that d along the upper section 16.

The water channel 8 is obtainable e.g. by extrusion.

Each fixing member 24 comprises a tubular sleeve 42 adapted to receive a shorter fuel rod 4 therein, and inwardly protruding projections 44 adapted to contact the outer surface of a shorter fuel rod 4 passing trough the sleeve 42.

Each fixing member 24 is fixed on the lower section 14 in one of the grooves 32, namely on the outer surface of the bottom wall 36 of the groove 32.

Several fixing members 24 are distributed and aligned longitudinally along the lower section 14 for receiving a shorter fuel rod 4.

Figure 3:
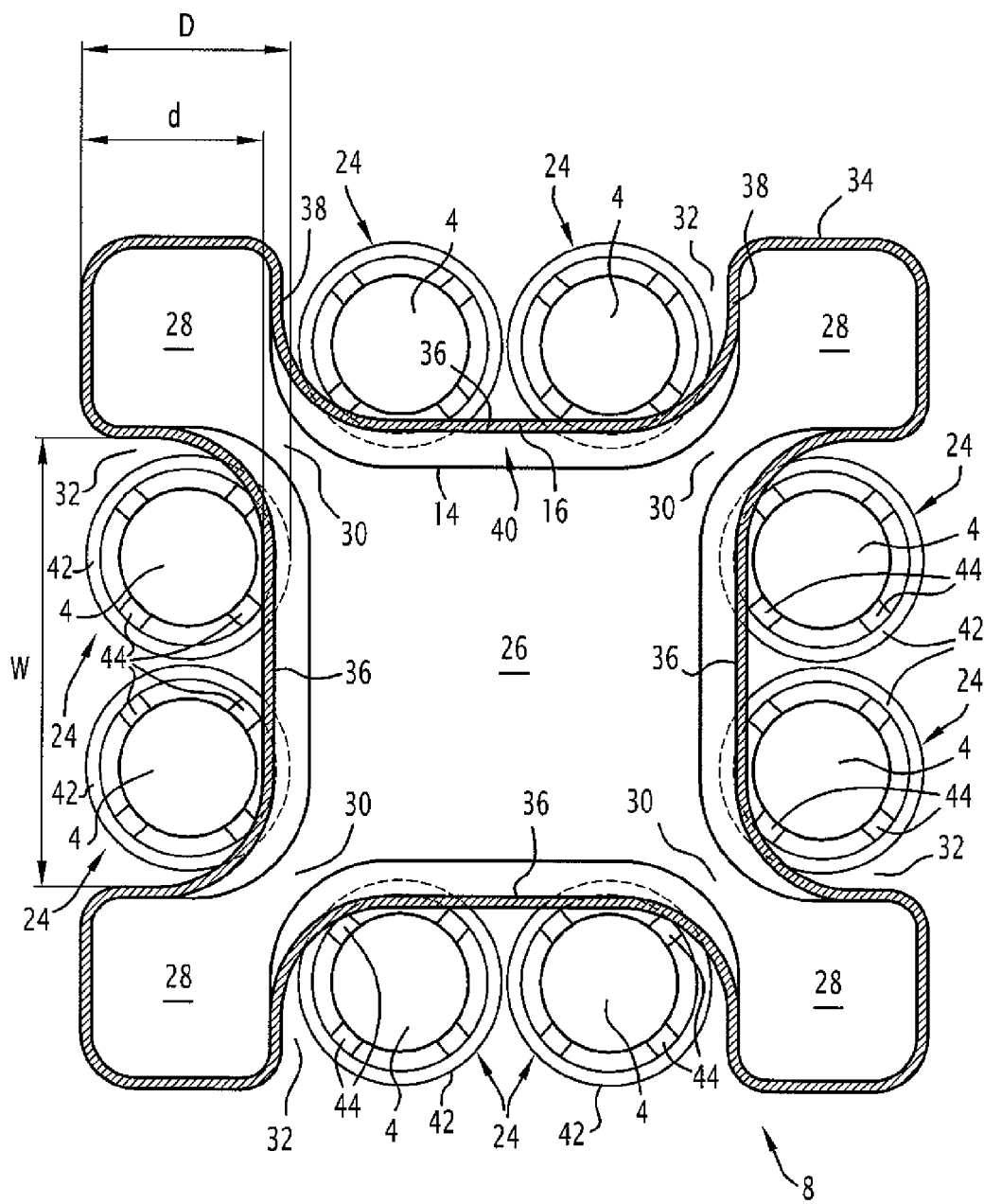
FIG. 3 is an enlarged view of the central zone of FIG. 2.

As illustrated on FIG. 3, fixing members 24 are arranged in pairs, the fixing members of each pair being disposed side-by-side in the same groove 32 for receiving two shorter fuel rods 4. The fixing members 24 of each pair are separate. In an alternative, two adjacent fixing members 24 are connected one to the other and form a 2×1 fixing device.

The depth of the groove 32 at the upper section 16 and the fixing members 24 are adapted such that the outer surface of each short fuel rod 4 does not radially interfere with the bottom wall 36 and lateral walls 38 of the groove 32.

In operation, water flows through the water channel 8 and also through the fuel channel 10 between the fuel rods 4, 6.

The water serves as a moderator for the nuclear reaction: it slows down the neutrons emitted by the fuel pellets contained in the fuel rods 4, 6. The water also serves as a coolant and exchanges heat with the fuel rods 4, 6.

The water channel 8 surrounded by the fuel rods 4, 6 enables to increase the moderator (water) to fuel ratio and the coolant amount in a central region of the fuel assembly 2.

The water flow is heated from the lower end to the upper end of the fuel assembly 2. At the upper end, the water flow is in vapour-liquid phase, the quantity of vapour increasing from lower end to upper end.

Vaporized water is less efficient than liquid water as a moderator, and efficiency of fuel burning depends among others on the moderator to fuel ratio.

The shorter fuel rods 4 reduce the amount of nuclear fuel in the upper region of the fuel assembly 2. The upper section 16 of larger cross section of the water channel 8 provides a greater amount of water in the upper region of the fuel assembly.

As a result, it is possible to compensate a decrease of moderator to fuel ratio due to increasing amount of vaporized water.

Figures 4, 5:
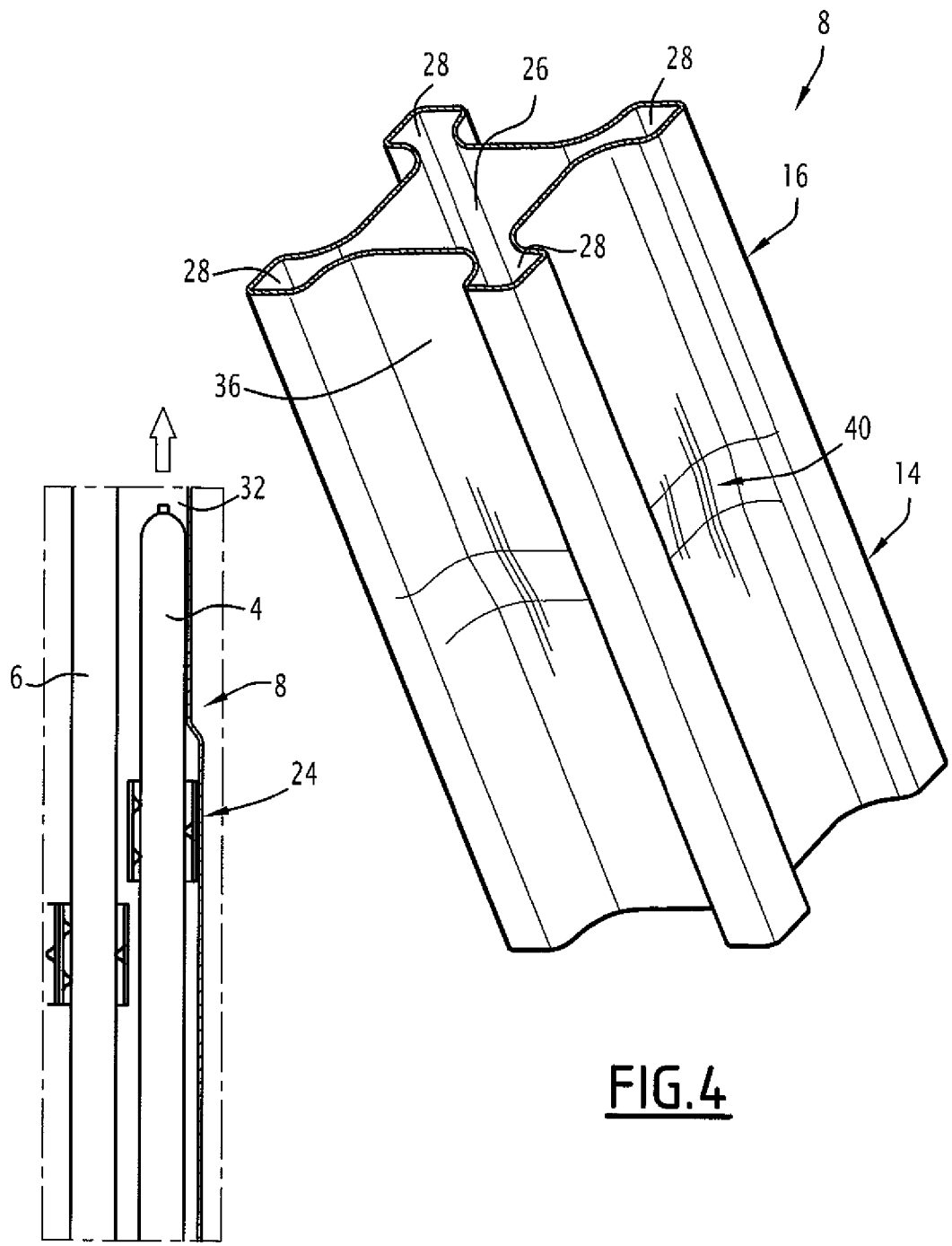
FIG. 4 is a partial perspective view of the water channel.
FIG. 5 is a partial view of the fuel assembly of FIG. 1 illustrating maintenance operations on the fuel assembly.

As illustrated on FIG. 5, each shorter fuel rod 4 can be gripped from the upper end of the fuel assembly 2 and slide upwardly through the groove 32 along the upper section 16 for extracting the short rod 4 without removing the water channel 8, e.g. in view of maintenance operations. A shorter fuel rod 4 can be inserted in the corresponding fixing member 24 in the same manner.

This is due to the fact that the grooves 32 provided in the lower section 14 extend along the upper section 16 with a depth adapted so that a shorter fuel rod 4 will not interfere with the walls 36, 38, and specifically the bottom walls 36 upon longitudinal extraction or insertion.

Maintenance operations can thus be conducted more easily. It is namely possible to replace a damaged shorter fuel rod 4, without extracting the water channel 8.

The fixing members 24 dedicated to the shorter fuel rods 4 adjacent to the water channel 8 enable to simplify the shape of the spacers 18 despite the grooves 32, since it is possible to provide a passage 22 of square cross section. The spacers 18 can be the same along the lower section 14 and the upper section 16.

The cruciform shaped cross section of the water channel 8 provides a good distribution of the water in a transverse plane of the fuel assembly 2. The main duct 26 is adjacent to eight fuel rods 4. Each lateral duct 28 is adjacent to seven fuel rods 4, 6.

This distribution is obtained with a single water channel. The fuel assembly 2 can thus be manufactured economically.

The water channel 8 is obtainable e.g. by extrusion.

In the illustrated embodiment, the longitudinal axis of the water channel coincides with the longitudinal central axis of the fuel assembly. In an alternative, the longitudinal axis of the water channel is offset with respect to the longitudinal central axis of the fuel assembly 2.

In alternative embodiments, the fuel rods 4, 6 are arranged in a square array having a different number of cells (e.g. 8×8, 9×9 . . . to 11×11 or more), the array has a different outer shape (e.g. hexagonal), the water channel has a different shape and replaces a different number of fuel rods in the array, and/or the water channel passage has a different shape and replaces a different number of fuel rods in the array.

What is claimed is:

1. A nuclear fuel assembly for boiling water reactors, comprising: a tubular water channel extending along a longitudinal axis and having an upper section of a larger cross-section area than a lower section and at least one fuel rod receiving groove extending longitudinally on an outer surface of the lower section, fuel rods extending parallel to the longitudinal axis of the channel and disposed in an array around the water channel and fixing members fixing at least one of the fuel rods to the water channel in the at least one fuel rod receiving groove below the upper section, wherein the at least one fuel rod receiving groove extends along the upper section such that the at least one fuel rod received in the fixing members is longitudinally extractable or insertable from an upper end side of the fuel assembly without extracting the water channel.

2. The nuclear fuel assembly as recited in claim 1 wherein the at least one groove is of a constant width along the lower section and the upper section.

3. The nuclear fuel assembly as recited in claim 1 wherein the fuel rod receiving groove has a depth larger in the lower section than in the upper section.

4. The nuclear fuel assembly as recited in claim 1 wherein the fuel rod receiving groove is adapted to receive at least one fuel rod.

5. The nuclear fuel assembly as recited in claim 4 wherein the fuel rod receiving groove is adapted to receive at least two fuel rods side-by-side.

6. The nuclear fuel assembly as recited in claim 1 wherein the water channel has a main duct and at least two lateral ducts in fluid communication with the main duct along the whole length of the water channel, the at least two lateral ducts defining between them the at least one fuel rod receiving groove on an outer surface of the water channel.

7. The nuclear fuel assembly as recited in claim 6 wherein each lateral duct has a cross section area being constant along the length of the water channel, and the main duct having a larger cross section area in the upper section than in the lower section.

8. The nuclear fuel assembly as recited in claim 6 wherein each lateral duct replaces at least one fuel rod in an array.

9. The nuclear fuel assembly as recited in claim 8 wherein each lateral duct replaces one fuel rod in the array.

10. The nuclear fuel assembly as recited in claim 6 wherein the main duct replaces at least one fuel rod in an array.

11. The nuclear fuel assembly as recited in claim 10 wherein the main duct replaces a square unit of several fuel rods in the array.

12. The nuclear fuel assembly as recited in claim 11 wherein the main duct replaces a four fuel rods square unit in the array.

13. The nuclear fuel assembly as recited in claim 6 wherein the water channel has four lateral ducts defining between them four fuel rod reception grooves around the water channel.

14. The nuclear fuel assembly as recited in claim 1 wherein the water channel has a cruciform cross section replacing the fuel rods disposed in diagonals of a fuel rods square unit of the array.

15. The nuclear fuel assembly as in claim 14 wherein the water channel replaces the fuel rods disposed in the diagonals of a sixteen fuel rods square unit of the array.

* * * * *